United States Patent [19]

Christophliemk et al.

[11] Patent Number: 4,557,907
[45] Date of Patent: Dec. 10, 1985

[54] HYDROTHERMAL DISINTEGRATION OF CALCINED ALUMINUM OXIDE WASTES

[75] Inventors: Peter Christophliemk, Düsseldorf; Jürgen von Laufenberg, Haan; Rudolf Novotny, Düsseldorf; Siegfried Staller, Ratingen; Friedrich W. Diekötter, Langenfeld, all of Fed. Rep. of Germany

[73] Assignee: Henkel Kommanditgesellschaft auf Aktien, Düsseldorf, Fed. Rep. of Germany

[21] Appl. No.: 499,038

[22] Filed: May 27, 1983

[30] Foreign Application Priority Data

Jun. 28, 1982 [DE] Fed. Rep. of Germany ....... 3224040

[51] Int. Cl.$^4$ ................................................ C01F 7/06
[52] U.S. Cl. ...................................... 423/119; 423/131
[58] Field of Search ......................... 423/119, 121, 131

[56] References Cited

U.S. PATENT DOCUMENTS

| | | | |
|---|---|---|---|
| 2,244,194 | 6/1941 | Haglund | 23/143 |
| 2,946,658 | 7/1960 | Donaldson | 423/121 |
| 3,401,009 | 9/1968 | Gittos | 423/121 |
| 3,728,432 | 4/1973 | Petitjean et al. | 423/121 |
| 3,773,890 | 11/1973 | Fox et al. | 423/58 |
| 3,814,701 | 6/1974 | Browning | 252/412 |
| 3,859,413 | 1/1975 | Haas | 423/122 |
| 4,113,832 | 9/1978 | Bell et al. | 423/131 |

OTHER PUBLICATIONS

"Gmelins Handbuch der Anorganischen Chemie", vol. Aluminum, Part B, (1934), pp. 78, 97.
Hackh's Chemical Dictionary.

*Primary Examiner*—H. T. Carter
*Attorney, Agent, or Firm*—Ernest G. Szoke; Henry E. Millson, Jr.; Mark A. Greenfield

[57] ABSTRACT

A process for hydrothermally disintegrating wastes or residues having a high content of calcined aluminum oxides by reacting said wastes or residues with an aqueous sodium hydroxide solution having a concentration of sodium hydroxide of from about 20 to about 50% by weight at a temperature in the range of from about 180° to about 250° C. under a saturated steam pressure corresponding to said temperature. The sodium aluminate solution obtained is separated off and optionally filtered.

17 Claims, 2 Drawing Figures

000
HYDROTHERMAL DISINTEGRATION OF CALCINED ALUMINUM OXIDE WASTES

BACKGROUND OF THE INVENTION

This invention relates to the utilization of chemical wastes and residues having a high content of calcined aluminum oxides by subjecting them to a hydrothermal reaction with sodium hydroxide at a temperature above about 180° C. to form sodium aluminate solution, wherein the sodium aluminate solution thus formed can be used for further reactions.

Calcined aluminum oxides are used for a variety of commercial applications, for example as drying agents and sorbents, catalysts and catalyst supports, or as filter aids. "Spent" products of this type, i.e. contaminated products of which the sorptive or catalytic effect has been exhausted or which can no longer be used for other reasons, generally have to be dumped. Depending on the nature of the charge or contamination, they may even have to be subjected to a pretreatment or stored in special dumps.

Accordingly, a process is needed for the ecologically and economically efficient utilization of chemical wastes and residues containing calcined aluminum oxides, in which the disadvantages referred to above are avoided. In addition, the process should achieve as high a volume/time yield as possible for as low a consumption of energy as possible.

It is known to the expert that the high-temperature modifications of aluminum oxide are chemically very resistant. It is expressly pointed out in the literature that $\alpha$-$Al_2O_3$ in particular is "substantially insoluble in alkalis" (GMELIN).

DESCRIPTION OF THE INVENTION

Figure 1:
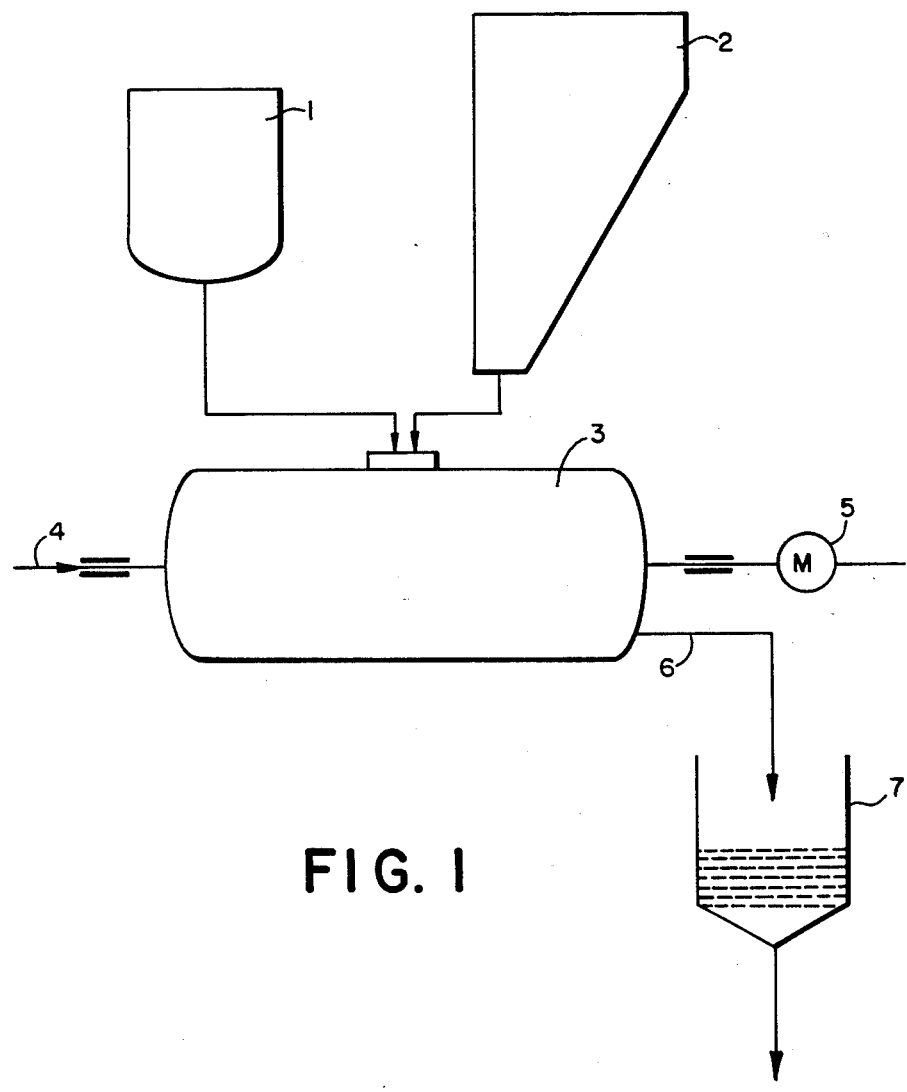
FIG. 1 sets forth in schematic form a flow chart of one embodiment of the present process.

It has now surprisingly been found that the calcined aluminum oxides (including $\alpha$-$Al_2O_3$) contained in the abovementioned residues may be economically reacted under commercially practical conditions with sodium hydroxide to form soluble products of the sodium aluminate type. The solution containing sodium aluminate may be used for further chemical reactions, depending on the contaminants and after any purification which may be necessary.

Accordingly, the present invention relates to a process for the hydrothermal disintegration of chemical wastes and residues having a high content of calcined aluminum oxides with aqueous sodium hydroxide solution under pressure and at elevated temperature. In the process of the invention, aqueous sodium hydroxide solution having a concentration of from about 20 to about 50% by weight is reacted with the waste and residues containing aluminum oxide at temperatures in the range from about 180° C. to about 250° C. and under the saturated steam pressures corresponding to these temperatures, the sodium aluminate solution obtained is separated off and, optionally, filtered.

In order to obtain significant dissolution even of the least alkali-soluble calcined aluminum oxide, $\alpha$-$Al_2O_3$, in an economical volume/time yield, reaction temperatures of at least about 180° C. have to be applied for alkali concentrations in the contact solution of at least about 20% of NaOH. According to the invention, however, reaction temperatures of the order of about 200° C. and alkali concentrations of about 30% NaOH are technically preferred. Under these conditions, powder-form $\alpha$-$Al_2O_3$ for example can be almost completely dissolved in a quantity of more than about 10% by weight, based on the mixture as a whole, over a period of about 3 to 4 hours.

Although the reaction time required for dissolving most of the calcined aluminum oxides may be shortened with increasing temperature, it is best in practice not to exceed reaction temperatures of about 250° C. and alkali concentrations of about 50% NaOH in the contact solution. In the interests of a rapid reaction, the aluminum oxide-containing solid should be introduced in as finely divided a form as possible. The reaction mixture is kept in motion at least to such an extent that the finely suspended solid does not sediment. If, on completion of the hydrothermal reaction, significant quantities of residue are still present in the aluminate solution formed, the aluminate solution may optionally be filtered, depending on the purpose for which it is to be used.

In general, any of the reaction vessels or reactors normally used for hydrothermal high-pressure syntheses, such as for example rotating or static pressure vessels and also tube reactors, can be used for carrying out the process according to the invention.

In the interests of a high volume/time yield, it is best to use the aluminum oxide component in excess so that it is not completely hydrothermally dissolved.

In the following, the "aluminum oxide component" is understood to mean those chemical wastes and residues that have a high content of calcined aluminum oxides, including those of the $\alpha$-$Al_2O_3$ type.

In one preferred embodiment of the invention, the hydrothermal reaction is carried out in a rotating, cylindrical pressure vessel which is mounted for rotation about its horizontal axis.

Referring now to FIG. 1, this figure shows by way of example a flow chart for this particular embodiment of the process according to the invention. Aqueous sodium hydroxide solution from storage vessel 1 and the aluminum oxide component from storage vessel 2 are introduced in batches into rotating reaction vessel 3 equipped with a saturated steam inlet 4, drive motor 5, and outlet opening 6. The aqueous suspension of the aluminum oxide component in the aqueous aluminum hydroxide solution is then heated to the desired reaction temperature in rotating reaction vessel 3. Heating can be carried out both indirectly by use of heating elements (not shown) in reaction vessel 3 or by jacket heating thereof (not shown), and directly by introduction of saturated steam into reaction vessel 3 through steam inlet 4. In the interests of a high heating rate, saturated steam is preferably introduced into the reaction mixture until the desired reaction temperature is reached; the saturated steam pressure corresponding to that temperature being simultaneously adjusted in the reaction vessel. In this connection, the following table shows by way of example some comparison values between temperature and saturated steam pressure:

| Temperature (°C.) | Pressure (bars) |
| --- | --- |
| 150 | 3.8 |
| 160 | 5.3 |
| 170 | 7.0 |

-continued

| Temperature (°C.) | Pressure (bars) |
|---|---|
| 180 | 9.3 |
| 190 | 12.0 |
| 200 | 15.0 |
| 225 | 25.0 |

The reaction mixture is left in the rotating pressure vessel under the established temperature/pressure conditions until a sample of the sodium aluminate solution formed shows that the required $Al_2O_3$ concentration has been reached. The reaction times required may generally be empirically determined in the course of a few reactions.

The rotating pressure vessel is then stopped, outlet opening 6 is opened, and the sodium aluminate solution, which is still under pressure or vented to normal pressure, is allowed to flow through outlet opening 6 to filter 7 where it is filtered and the filtrate collected for further processing.

In a second preferred embodiment of the invention, a stationary vessel is used for the hydrothermal reaction. In this embodiment, the liquid phase of the reaction mixture is circulated at temperatures of from about 180° C. to about 250° C. and under the saturated steam pressures corresponding to those temperatures through a solid bed containing calcined aluminum oxide introduced into the stationary reaction vessel to form a fluidized bed and also through a bypass pipe positioned outside the vessel until the concentration of $Al_2O_3$ in the liquid phase has reached the required value.

This embodiment of the invention is essentially based on the formation of a fluidized bed of the reaction mixture in the actual reaction zone, in which a permanent and intensive exchange of material takes place in this way between the reaction components on the one hand and the sodium aluminate solution on the other hand. Compared with conventional hydrothermal processes, the formation of this fluidized bed under otherwise the same reaction conditions and for the same input of aluminum oxide component results both in a considerable reduction in the reaction time and also in a high concentration of $Al_2O_3$ in the sodium aluminate solution formed.

Figure 2:
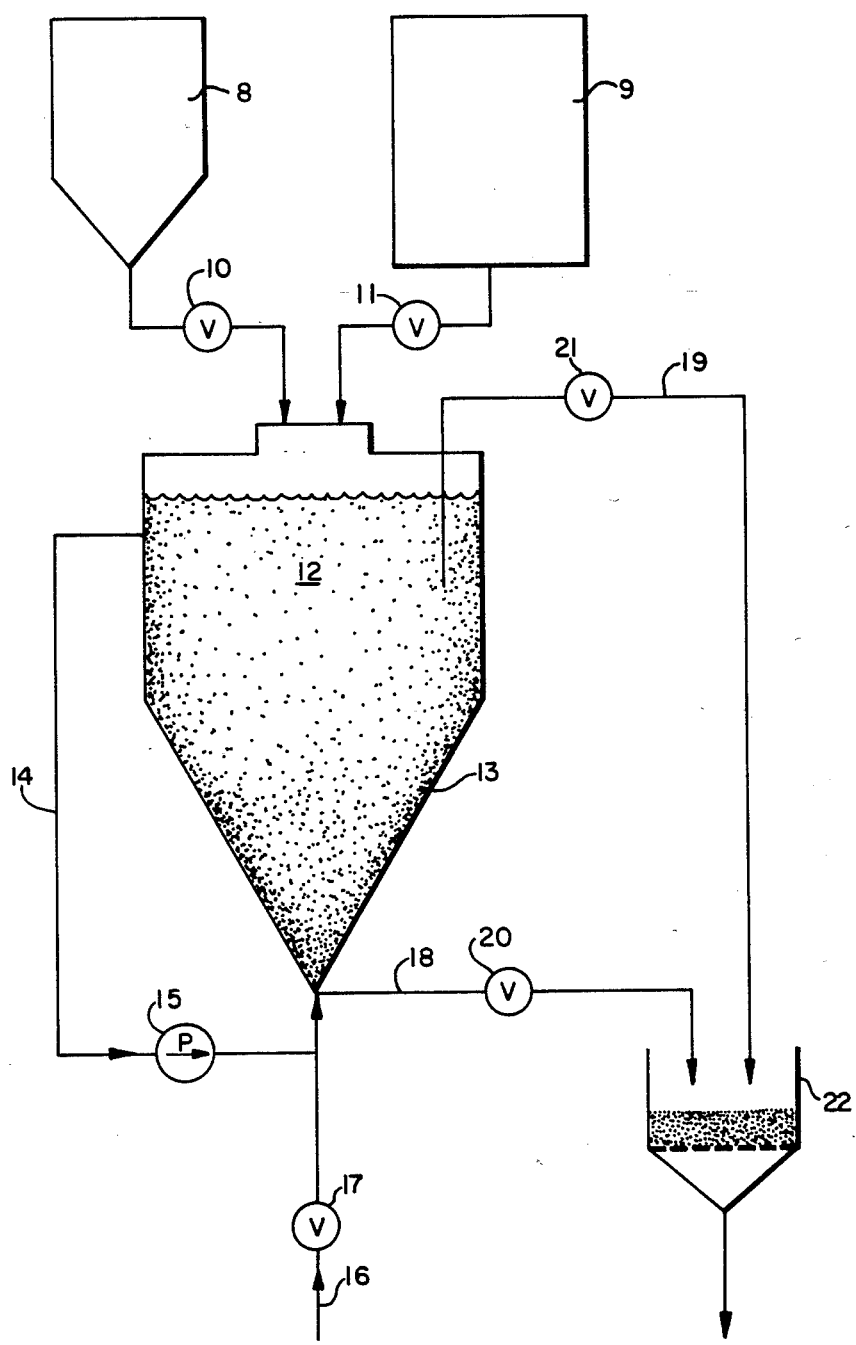
FIG. 2 sets forth in schematic form a flow chart of a second embodiment of the present process.

Referring to FIG. 2, this figure shows by way of example a flow chart for this second embodiment of the process according to the invention. The aluminum oxide component from storage vessel 8, and aqueous sodium hydroxide solution from storage vessel 9, are introduced in batches through metering valves 10 and 11 respectively into stationary reaction vessel 12, which preferably has a conical shaped lower section 13. The aluminum oxide component settles primarily in conical shaped lower section 13 as a solid bed. In order to form the fluidized bed crucial to this embodiment of the invention, this solid bed is then brought into and kept in motion in the manner of a fluidized bed by continuously pump-recirculating the liquid phase of the reaction mixture. In the course of this recirculation process, the liquid phase is run off from the reaction vessel at its upper end and introduced back into the reaction vessel at its lower end through bypass pipe 14 positioned outside the vessel and connected to pump 15, so that this stream of liquid always flows under pressure into the solid bed—or into the already formed fluidized bed—from below.

In the context of the invention, the term "liquid phase of the reaction mixture" is understood to comprise both the aqueous sodium hydroxide used and also the sodium aluminate solution formed during the reaction, even though this sodium aluminate solution may also contain parts of the fluidized aluminum oxide component.

In this embodiment as well as in the first embodiment, the reaction mixture is best heated to the necessary reaction temperature by the direct introduction of saturated steam into the reaction vessel (12); the steam also being introduced with advantage into the vessel at its lower end through inlet 16 and metering valve 17 to assist in the fluidization of the solid bed to form the fluidized bed crucial to this embodiment of the invention. If necessary, the reaction mixture can be additionally heated indirectly be means of suitable heating elements (not shown) in the reaction vessel or by jacket heating thereof (not shown). If desired, bypass pipe 14 can also be provided with a suitable heating jacket (not shown). However, saturated steam is preferably introduced into the reaction mixture until the required reaction temperature has been reached; the saturated steam pressure corresponding to that temperature being simultaneously adjusted in reaction vessel 12.

In accordance with the invention, it is also preferred in this embodiment to carry out the reaction at a temperature in the range of from about 180° C. to about 210° C. and under the saturated steam pressures corresponding to those temperatures. The choice of a relatively low reaction temperature in this preferred temperature range, in conjunction with the short reaction times obtainable in accordance with the invention, enables the hydrothermal synthesis to be carried out with low energy consumption.

After the required reaction temperature has been reached, the reaction mixture is left in reaction vessel 12 under the established temperature/pressure conditions (while pump-recirculation of the liquid phase continues) until a sample of the sodium aluminate solution formed shows that the required $Al_2O_3$ concentration has been reached. Once again, the reaction times required may generally be empirically determined in the course of a few reactions.

On completion of the reaction, the sodium aluminate solution formed, which is still under pressure or vented to normal pressure, is transferred through pipes 18 or 19 with metering valves 20 and 21 respectively, to filter 22.

This second preferred embodiment is also suitable for continuous operation. For this variation (not shown) the sodium aluminate solution formed is continuously discharged from the reaction vessel while the reaction components are continuously introduced into the reaction vessel. The aluminum oxide component and the aqueous sodium hydroxide are preferably introduced into the reaction vessel using appropriate pressure pumps. The aluminum oxide component is preferably introduced directly into the lower part of the reaction vessel through a dip pipe arranged therein. Maintenance of the required reaction temperature and pressure is carried out by a correspondingly controlled and optionally continuous input of saturated steam. After a certain starting period of the hydrothermal reaction, which may be determined by measuring the $Al_2O_3$ concentration of samples of the sodium aluminate solution formed, the sodium aluminate solution obtained is continuously removed from the reaction vessel, and transferred to a filter.

In another preferred embodiment of the invention, a solid filter is used for separating off the sodium aluminate solution obtained by the process of the invention by filtration. According to this embodiment, the filter medium preferably used for this solid filter is the excess aluminum oxide component already used for the reaction from the completed hydrothermal synthesis, optionally in admixture with excess aluminum oxide component from one of the preceding batch-type reactions or "fresh", i.e. not yet hydrothermally treated aluminum oxide component. To prepare the solid filter, the excess solid settling in the lower part of the reaction vessel is first transferred to the filter bed. Any aluminum oxide component still left in the reaction vessel can be left therein for the following reaction or alternatively may be used for preparing the solid filter for one of the following batches.

Before the sodium aluminate solution to be filtered is applied to the filter, the solid bed of the filter is preferably treated with a small, circulated quantity of liquid, for example water or optionally sodium aluminate solution, flowing in from below in such a way that the fines of the aluminum component are flushed to the surface of the filter bed and, hence, form a sufficiently effective filter layer.

According to this embodiment, it is also preferred to subsequently return the aluminum oxide component of the filter bed used for filtration to the process and hence to re-use this aluminum oxide component, including the sodium aluminate solution adhering thereto, for the following reaction. Accordingly, it has proven to be of particular advantage when carrying out the filtration step to apply the still hot aluminate solution under pressure to the solid filter, since by so doing, the aluminum oxide component is then preheated for the following reaction and the heat content of the hot aluminate solution is optimally utilized in an energy-saving manner. In this way, it is possible on the one hand to avoid having to eliminate the filter material—unavoidable in conventional processes—and, on the other hand, to save considerable amounts of energy over the process as a whole.

Aluminum hydroxide can be precipitated in different ways from the aluminate solution obtained in the process of the invention. By virtue of its high alkali content, however, it is more economical to use the aluminate solution directly, for example as the aluminate component in the production of aluminum silicates, and more particularly and preferably in the production of zeolitic sodium aluminum silicate of the NaA type.

Materials which, in addition to calcined aluminum oxides, also contain other aluminum-containing components and/or alkali donors are advantageously subjected to the hydrothermal reaction according to the invention, because these other constituents are fully utilized without any pretreatment. The aluminum oxide based filter aids used for example for the filtration of aluminate solutions, represent particularly suitable materials of this type because they still contain considerable residues of sodium aluminate, aluminum hydroxides and sodium hydroxide in addition to the calcined aluminum oxides. "Spent" filter aids of this type, which would otherwise have to be expensively treated and dumped, are additionally utilized through the hydrothermal reaction according to the invention.

The invention will be illustrated by the following examples which are given for this purpose only and not for purposes of limitation.

EXAMPLES

The following examples were carried out on an industrial scale.

A filter aid based on $\alpha$-$Al_2O_3$ used for the filtration of aluminate solutions was used as the aluminum oxide component. This "spent" moist filter aid still contained considerable quantities of adhering aluminate solution. Its solids content (as determined by calcination for 1 hour at 800° C.) amounted to 75.5%. According to X-ray fluorescence analysis, its $Na_2O$-content amounted to 7.5% and its total $AL_2O_3$-content to 68%. Of this total quantity of $Al_2O_3$, analysis showed that the proportion of $\alpha$-$Al_2O_3$ amounted to approximately 62% and the proportion of $Al_2O_3$ from other components (such as sodium meta-aluminate and/or aluminum hydroxide) to approximately 6%. The suspended solid contained more than 90% of particles smaller than 10 $\mu$m.

EXAMPLE 1

The reaction vessel used was a horizontally arranged, cylindrical pressure vessel (volume when empty 24 m3) mounted for rotation about its horizontal axis. The pressure vessel was heated by the direct introduction of saturated steam, using the procedure described above for the first preferred embodiment of the invention. The rotational speed of the rotating reactor amounted to 6 r.p.m.
Total filling: 17.3 t
Aluminum oxide component (moist): 5.2 t
Sodium hydroxide (50% by weight): 7.4 t
Water: 4.7 t
Alakli concentration: 30% by weight
Reaction temperature: 200° C.
Reaction time: 3 hours The sodium aluminate solution formed after the indicated reaction time was filtered through a solid filter using the unreacted aluminum oxide component.

The solution thus obtained contained 13.4% of $Al_2O_3$.

EXAMPLE 2

This example was carried out in a cylindrical, vertically arranged stationary pressure vessel (volume when empty 3.6 m³) which was conically shaped at its lower end and equipped with a bypass pipe in accordance with the description of the second embodiment given above and using the procedure described therefor. Heating was carried out by the direct introduction of saturated steam at the lower end of the pressure vessel.
Total filling: 4.8 t
Aluminum oxide component (moist): 1.5 t
Sodium hydroxide (50% by weight): 2.0 t
Water: 1.3 t
Alkali concentration: 30% by weight
Reaction temperature: 200° C.
Reaction time: 2 hours The sodium aluminate solution formed after the indicated reaction time was filtered through a solid filter using the unreacted aluminum oxide component.

The solution thus obtained contained 14.1% of $Al_2O_3$.

What is claimed is:
1. A process for hydrothermally disintegrating wastes or residues having a high content of $\alpha$-$Al_2O_3$ to sodium aluminate comprising reacting said wastes or residues with an aqueous sodium hydroxide solution having a concentration of sodium hydroxide of from about 20 to about 50% by weight at a temperature in the range of from about 180° C. to about 250° C. under a saturated steam pressure corresponding to said temperature.

2. A process in accordance with claim 1 wherein the reaction mixture is filtered and the filtrate recovered.

3. A process in accordance with claim 1 wherein the concentration of sodium hydroxide in the aqueous sodium hydroxide solution is from about 25 to about 40% by weight.

4. A process in accordance with claim 3 wherein said concentration is about 30% by weight.

5. A process in accordance with claim 4 wherein the reaction temperature is about 200° C.

6. A process in accordance with claim 3 wherein the reaction temperature is in the range of from about 180° C. to about 210° C.

7. A process in accordance with claim 1 wherein the reaction temperature is in the range of from about 180° C. to about 210° C.

8. A process in accordance with claim 1 wherein the reaction temperature is about 200° C.

9. A process in accordance with claim 1 wherein the waste or residue is present in amount such that the $\alpha\text{-}Al_2O_3$ component is present in excess compared to the sodium hydroxide component.

10. A process in accordance with claim 1 wherein the waste or residue is used in process in finely divided form.

11. A process in accordance with claim 1 wherein the reaction is carried out in a rotating, cylindrical pressure vessel mounted for rotation about its horizontal axis.

12. A process in accordance with claim 1 wherein the reaction is carried out in a fluidized bed in a stationary reaction vessel.

13. A process in accordance with claim 12 wherein the reaction is carried out continuously.

14. A process in accordance with claim 1 wherein the sodium aluminate solution obtained by the process is filtered through a solid filter containing excess $\alpha\text{-}Al_2O_3$ component left from the reaction.

15. A process in accordance with claim 14 wherein after filtration, the $\alpha\text{-}Al_2O_3$ component of the filter bed used for filtration, including the sodium aluminate solution adhering thereto, is returned to the hydrothermal treatment process.

16. A process in accordance with claim 14 wherein the sodium aluminate solution formed by the process is applied to the solid filter while under pressure and while still hot.

17. A process in accordance with claim 14 wherein the solid filter containing excess $\alpha\text{-}Al_2O_3$ component left from the reaction also contains excess $\alpha\text{-}Al_2O_3$ from a preceding batch-type reaction.

* * * * *